UNITED STATES PATENT OFFICE.

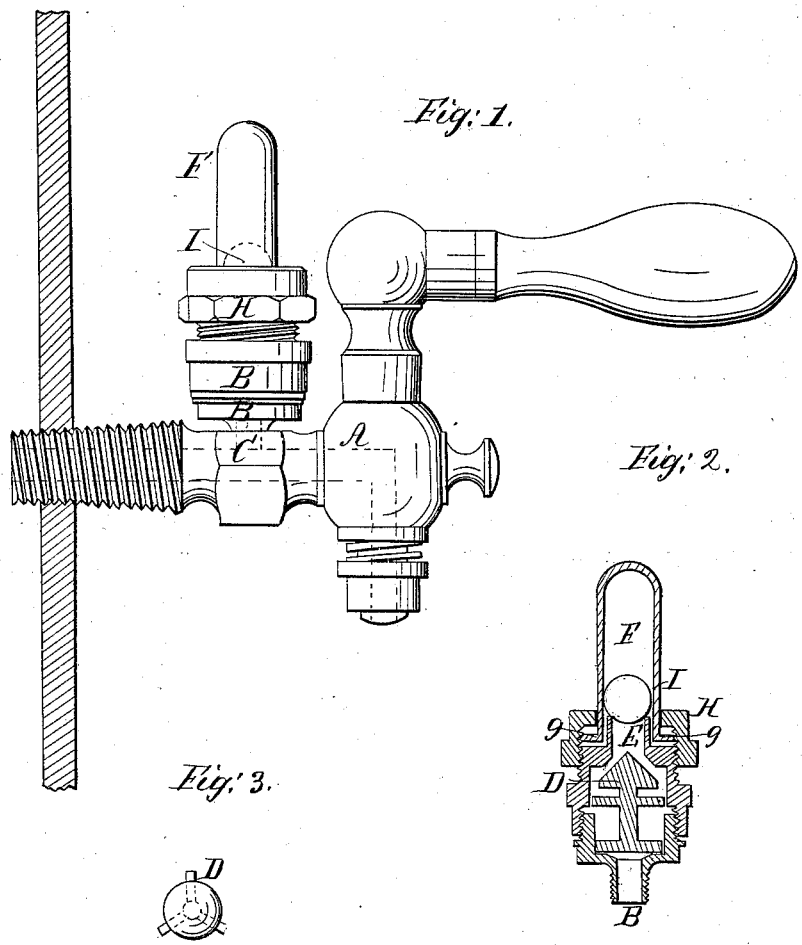

HENRY HISE, OF OTTAWA, ILLINOIS.

IMPROVEMENT IN GAGE-COCKS.

Specification forming part of Letters Patent No. 37,292, dated January 6, 1863.

*To all whom it may concern:*

Be it known that I, HENRY HISE, of the city of Ottawa, in the county of La Salle, State of Illinois, have invented a new and Improved Water-Gage Cock for Steam-Boilers; and I do hereby declare that the following is a full, clear, and exact description of the same, reference being had to the accompanying drawings, forming part of this specification, in which—

Figure 1 is a side elevation. Fig. 2 is a sectional view. Fig. 3 is a top view of valve D.

Similar letters of reference indicate corresponding parts in the figures.

My invention consists in attaching a glass tube to any ordinary water-gage cocks by means of a column of brass or any other metal, with a valve inside the said column, so constructed as to close off the steam and water, in case the glass tube should get broken by accident or otherwise, and to permit the said glass tube to be replaced by a new one without waiting for the steam to subside in the boiler, and combining a floating ball of any light substance, to float inside the said glass tube, so that when the water covers the mouth of the said gage-cock in the boiler the pressure of the water will force the ball against the top of the inside of the glass tube, and when the water is below the mouth of the cock in the boiler the water will fall out of said glass tube, and the float or ball will be almost invisible to the person in charge, so at a glance the engineer or any other person can see if the water is up to the gage-cock in said boiler.

To enable others skilled in the art to make and use my invention, I will proceed to describe its construction and operation.

A is the ordinary gage-cock now in use, having a hole drilled in, as at C. B B is a column of metal, tubular form, which is screwed into the cock A at the opening C. D is a valve so arranged as to close against the seat at E, to prevent the steam and water from flowing out in case the glass tube should get broken. F is a glass tube attached to the column B B by means of a nut, H. The said glass tube has a flange on, as $g\,g$, the joint being packed with india-rubber or any other suitable material. I is a floating ball of any light substance, to float inside the glass tube F, for the purpose of detecting the height of water in the boiler by the person in charge.

What I claim as my invention, and desire to secure by Letters Patent, is—

The attachment of a glass tube to the column B B, in combination with the valve D and floating ball I, when applied to a cock substantially as and for the purpose herein specified.

HENRY HISE.

Witnesses:
GUSTAV KOCH,
JAMES GRAHAM.